July 20, 1948.　　H. WEYENBERG ET AL　　2,445,702

TUBE COUPLING

Filed Nov. 6, 1944

Inventors:
Henry Weyenberg
Cornelius Quist
their Attys.

Patented July 20, 1948

2,445,702

UNITED STATES PATENT OFFICE 2,445,702

TUBE COUPLING

Henry Weyenberg and Cornelius Quist, Holland, Mich., assignors to Holland Furnace Company, Holland, Mich., a corporation of Delaware Application November 6, 1944, Serial No. 562,092

6 Claims. (Cl. 285—86)

This invention relates to a fitting serving as a terminal or connection for tubing of copper or brass, or other similar ductile material.

One object of the invention is to provide a new and improved coupling for tubing of the type indicated.

Another object of the invention is to provide a simple and readily applicable coupling serving as a terminal for a section of more or less pliable tubing, and adapted for repeated connection and disconnection without unduly deforming the tubing itself.

A further object of the invention is to provide a fitting serving as a terminal for tubing of brass, copper or the like, and arranged to clamp the terminal portion of the tubing itself in a manner which provides two lines of sealing contact between the tubing and the fitting to insure a liquid tight joint between them.

More specifically, the invention provides a two part fitting in which one part is formed with a bore through which the terminal portion of the tubing is entered with its end bent over in a bead, while the other part has an annular groove of graduated cross section into which the bead is wedged when the two parts are screwed together, the said other part having a bore which communicates with the bore of the tubing and serves as a continuation of the passage therein.

Other objects and advantages of the invention will be apparent from the following description taken in connection with the drawing in which.

Figure 1:
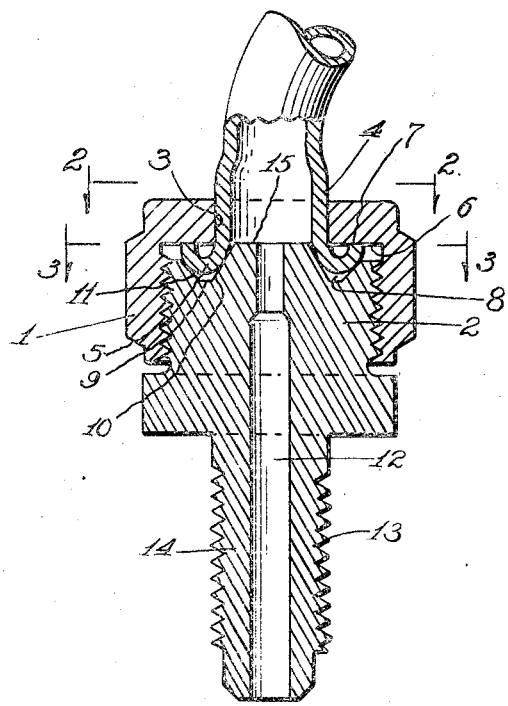
Fig. 1 is an axial sectional view of a coupling embodying this invention showing the terminal portion of a section of tubing secured therein.

While we have shown in the drawing and have herein described in detail a preferred form of our invention, it is to be understood that we do not intend to limit the invention to the specific form or application disclosed, but aim to cover all modifications and alternative constructions falling within the scope of the invention as expressed in the claims.

For making a suitably tight connection between a section of tubing of brass, copper or like ductile material and a pipe or chamber arranged to receive a threaded fitting, various structures have been devised, but in many cases the end of the ductile tubing material is more or less distorted by the first application of the fitting thereto so that it is not always possible to secure a tight connection if the fitting is repeatedly removed and reapplied. One advantage of the present structure is that it can be disconnected and connected frequently without impairing its efficiency as a liquid tight coupling.

As shown in the drawing, the coupling fitting consists of a cup-shaped member 1 and a plug member 2 which are formed with interengageable threads by which they may be secured together. The cup member 1 is provided with an axially disposed bore 3 into which the end or terminal portion 4 of the brass or copper tubing is inserted. The extreme end portion of the tubing is then bent back to form a channel-shaped bead 5 and the transaxial face 6 of the cup member 1 engages the outer edge 7 of the channel.

The opposing end of the plug 2 is formed with an annular groove 8 having a bottom wall 9 which is somewhat narrower than the channel-shaped bead 5 of the tubing. The side walls 10 and 11 of the groove 8 extend divergently from the bottom wall 9 toward the opposing face 6 of the member 1, and the rounded contour of the bead 5 is thus lodged in the groove 8 with its curved surfaces tangent to the diverging side walls 10 and 11. Then, as the parts 1 and 2 are screwed together in clamping engagement with the bead 5 the latter is more or less wedged into the groove 8 by the pressure of the part 1 bearing against the edge 7 of the bead 5.

Figure 2:
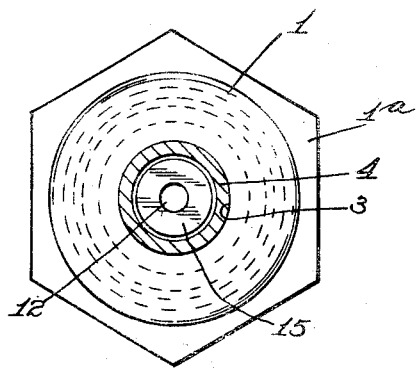
Fig. 2 is a transverse sectional view taken as indicated at line 2—2 on Fig. 1.
Figure 3:
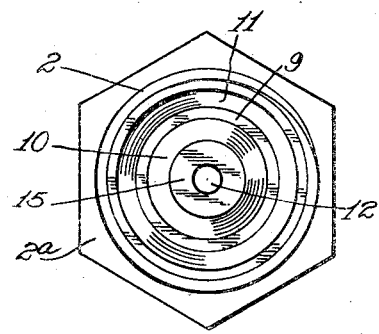
Fig. 3 is an end view of the plug member of the coupling being taken at the plane indicated at line 3—3 on Fig. 1.

Preferably, and as shown, the outer wall 11 of the groove 8 is disposed at an angle of about forty-five degrees to the axis of the member 2, while the inner wall 10 extends at about thirty degrees to said axis. Thus, the pressure exerted against the edge 7 of the channel tends to slide the curved face of the bead along the inclined wall 11 of the groove and inwardly toward the axis of the member 2, but the angle of the opposing wall 10 is such as to effectively prevent appreciable movement. The result is that the curved surfaces of the bead 5 are forced into sealing engagement with both faces of the groove 8, that is with the face 10 and with the face 11, thus providing a double seal between the end of the tubing and the plug member 2 of the coupling. Said member is formed with an axial bore 12 which registers and communicates with the bore of the tubing as seen in Fig. 1 so as to form a continuation of the passage therein, and external threads 13 on the stem of the plug 2 permit the plug to be secured in a threaded opening or clamped in an unthreaded opening, or coupled to a threaded pipe terminal as may be required. To facilitate adjusting the members 1 and 2 with relation to each other, the cup-shaped member 1 is formed with a hexagonal portion 1ª as seen in Fig. 2 and the plug member 2 may be provided with a hexagonal flange 2ª as shown in Fig. 3.

Preferably, the inclined face 10 of the groove 8 is longer than the inclined face 11 so as to form a central frusto-conical terminal for the plug 2 which at its outer end 15 is small enough to enter the end portion 4 of the tubing, and preferably the diameter of this outer end 15 is slightly less than the inner diameter of the tubing to avoid contact of its circular edge with the wall of the tubing and insure a merely tangential contact between the inner portion of the bead 5 and the included conical surface 10.

We claim as our invention:

1. In combination with a tube of ductile material, a coupling comprising an externally threaded plug member having a longitudinal opening and a cup-shaped member internally threaded to engage the threads of said plug member, the cup-shaped member having an end wall formed with an axial bore to receive the tube, the inner face of said end wall being flat and extending in a plane at right angles to the axis of said axial bore, the inner end of the plug member having an annular groove the opposite sides of which are divergently inclined upwardly at acute angles with relation to the axis of the coupling, the end portion of the tube being bent outwardly and back to form a channel-shaped bead the outer free edge of which bears squarely against said inner flat face of the end wall of the cup-shaped member, the rounded contour of the bead being positioned in said groove with its outer curved face bearing tangentially against the outer inclined face of the groove and its inner curved face bearing tangentially against the inner inclined face of the groove, whereby when the coupling members are screwed together the inner flat face of the cup-shaped member presses squarely against the free end of the bead of the tube and forces the outer curved face of the bead at an angle against the outer inclined side wall of the groove which in turn forces the inner face of the bead at an angle against the inner inclined side wall of the groove.

2. A tube and coupling combination as claimed in claim 1, in which the inclined inner side wall of the groove is longer longitudinally of the coupling than the inclined outer side wall of the groove.

3. A tube and coupling combination as claimed in claim 1 in which the bottom of the groove is spaced from the adjacent face of the bead when the tube end portion is clamped in the coupling, and the annular space within the outwardly bent bead is free of projections.

4. In combination with a tube of ductile material, a coupling comprising an externally threaded plug member and an internally threaded cup-shaped member, adapted to be screwed together, the latter having an apertured end wall the inner face of which is flat, the end of the plug member within the cup-shaped member being formed with an annular groove having an outer side wall inclined at approximately forty-five degrees with relation to the axis of the coupling and an inner wall inclined at approximately thirty degrees with relation to said axis, the end portion of the tube passing through the end wall of the cup-shaped member and being bent outwardly and back to form a channel-shaped bead the outer free edge of which bears squarely against said flat inner face of the cup-shaped member, said bead being positioned in said groove with the outer curved face of the bead bearing tangentially against the inclined outer side wall of the groove and the inner curved face of the bead bearing tangentially against the inclined inner side wall of the groove when the flat inner face of the cup-shaped member is forced squarely against the free end of the bead, the bottom of the bead being spaced away from the bottom of the groove when the coupling members are tightened together, the side walls of the groove diverging toward the flat inner face of the cup-shaped member.

5. A tube and coupling combination as claimed in claim 4, in which the inclined inner wall of the groove forms a tapered tip on the plug member which terminates in a flat end approximately flush with the inner flat face of the cup-shaped member and having an outside diameter slightly smaller than the inside diameter of the tube where it passes through the end wall of the cup-shaped member.

6. In combination with a tube of ductile material, a coupling comprising a plug member and a cup-shaped member, the cup-shaped member having an end wall having an axial bore to receive the tube, the inner face of said end wall being flat and extending in a plane at right angles to the axis of said axial bore, the end portion of the tube being bent outwardly and back to form a channel-shaped bead the outer free end of which bears squarely against said inner flat face of said end wall, the inner end of the plug member having an annular groove in which said bead is seated, the outer and inner side walls of said groove being straight and inclined divergently toward said inner flat face, the bottom of said groove being spaced from said bead when the bead is clamped in the groove, the channel of the bead being open and free of projections.

HENRY WEYENBERG.
CORNELIUS QUIST.

REFERENCES CITED

The following references are of record in the file of this patent:

UNITED STATES PATENTS

| Number | Name | Date |
|---|---|---|
| 431,816 | Lomasney | July 8, 1890 |
| 509,743 | Lane | Nov. 28, 1893 |
| 2,366,444 | Dorman | Jan. 2, 1945 |